United States Patent [19]

Fasching et al.

[11] Patent Number: 4,667,097

[45] Date of Patent: May 19, 1987

[54] COMPENSATED VIBRATING OPTICAL FIBER PRESSURE MEASURING DEVICE

[75] Inventors: George E. Fasching, Morgantown, W. Va.; David R. Goff, Christiansburg, Va.

[73] Assignee: The United States of America as represented by the Department of Energy, Washington, D.C.

[21] Appl. No.: 814,935

[22] Filed: Dec. 30, 1985

[51] Int. Cl.[4] ................................................ G01L 1/10
[52] U.S. Cl. ................................ 250/231 P; 250/227; 73/705; 350/96.29
[58] Field of Search ............... 250/231 P, 231 R, 227; 73/705, 800, 717, 862.39, 862.41, 862.59; 350/96.29

[56] References Cited

U.S. PATENT DOCUMENTS 4,564,289  1/1986  Spillman, Jr. ........................ 73/705
4,600,836  7/1986  Berthold, III et al. ......... 250/231 P Primary Examiner—Edward P. Westin
Attorney, Agent, or Firm—David E. Breeden; Stephen D. Hamel; Judson R. Hightower

[57] ABSTRACT

A microbending optical fiber is attached under tension to a diaphragm to sense a differential pressure applied across the diaphragm which it causes it to deflect. The fiber is attached to the diaphragm so that one portion of the fiber, attached to a central portion of the diaphragm, undergoes a change in tension; proportional to the differential pressure applied to the diaphragm while a second portion attached at the periphery of the diaphragm remains at a reference tension. Both portions of the fiber are caused to vibrate at their natural frequencies. Light transmitted through the fiber is attenuated by both portions of the tensioned sections of the fiber by an amount which increases with the curvature of fiber bending so that the light signal is modulated by both portions of the fiber at separate frequencies. The modulated light signal is transduced into a electrical signal. The separate modulation signals are detected to generate separate signals having frequencies corresponding to the reference and measuring vibrating sections of the continuous fiber, respectively. A signal proportional to the difference between these signals is generated which is indicative of the measured pressure differential across the diaphragm. The reference portion of the fiber is used to compensate the pressure signal for zero and span changes resulting from ambient temperature and humidity effects upon the fiber and the transducer fixture.

4 Claims, 1 Drawing Figure

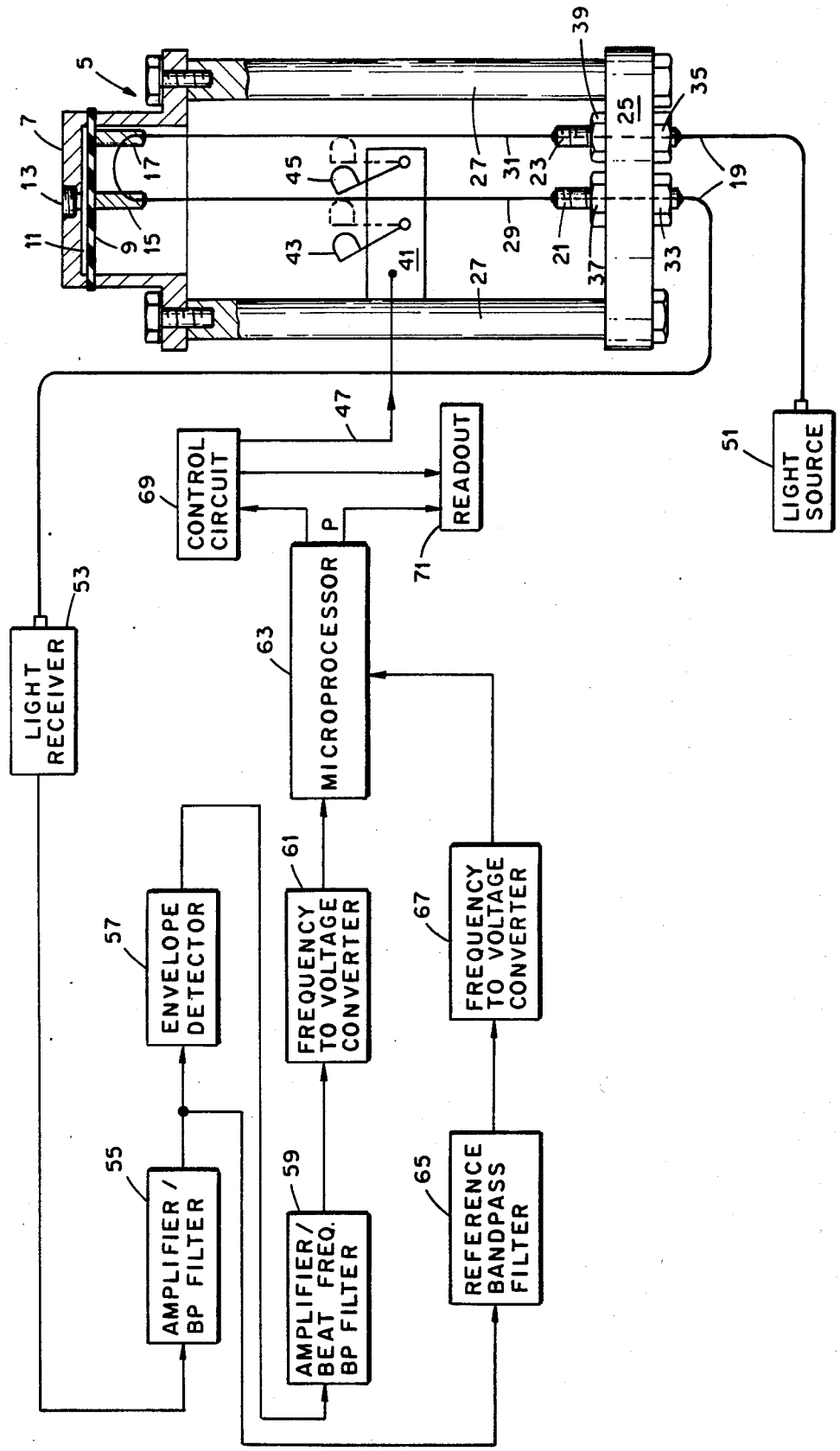

COMPENSATED VIBRATING OPTICAL FIBER PRESSURE MEASURING DEVICE

BACKGROUND OF THE INVENTION

This invention relates generally to pressure measuring devices and more specifically to fiber-optic pressure transducers.

In the art of pressure measuring, various devices based on the vibrating wire technique have been used to measure pressure. In one of these devices a length of wire is mounted in tension between a pressure sensitive diaphragm and a fixed mount in a controlled environment, such as an evacuated housing. The housing is formed of nonmagnetic materials so that the wire may by plucked by the use of an electromagnetic actuator positioned outside of the housing. Pressure applied to the diaphragm causes it to deflect and alter the tension on the wire, thereby altering the resonant frequency of the wire when plucked. The vibrating frequency of the wire is sensed, usually by the same electromagnetic coil which energizes the wire, and the frequency vibration is determined and converted to a calibrated measurement of the pressure applied to the diaphragm.

In these systems, the wire is housed in an evacuated housing and the housing materials are carefully selected in an effort to minimize errors introduced by changes in temperature. Also, it is difficult to mount the wire in the housing in a manner that eliminates creep in the wire which introduces errors into the measurement technique. These disadvantages limit the environments in which this type of pressure transducer may be used. In addition, these instruments are susceptible to stray electromagnetic or electrostatic interference, which further reduces there applications.

In order to overcome some of the disadvantages of vibrating wire type pressure transducers, optical-fiber pressure transducers have been used in which an optical fiber is mounted on one side of the pressure sensitive diaphragm similar to the arrangement of a strain gauge and the attenuation of light passing through the fiber is measured as an indication of the sensed pressure. As pressure is applied to the diaphragm in this arrangement, the fiber bends with the diaphragm causing the light transmitted through the fiber to be attenuated by an amount which increases with the curvature of fiber bending. Although this instrument is not susceptible to electromagnetic or electrostatic interference, it has not been found to be a reliable pressure measuring instrument due to excessive ambient temperature sensitivity (5 to 10% FS drift/50° F.).

Thus, there is a need for an accurate pressure transducer which is operable in varying environmental conditions and which may be used in areas where the instrument is exposed to electromagnetic or electrostatic interference.

SUMMARY OF THE INVENTION

In view of the above need, it is an object of this invention to provide a pressure transducer for the measurement of fluid pressures in varying environmental conditions.

Another object of this invention is to provide a pressure transducer as in the above object which is self compensating.

Further, it is an object of this invention to provide a pressure transducer as in the above objects which is not affected by stray electromagnetic or electrostatic interference.

Other objects and many of the attendant advantages of the present invention will become apparent from the following detailed description of a preferred embodiment of the invention taken in conjunction with the drawing.

In summary, the invention pertains to a pressure transducer in which differential pressure applied across a flexible diaphragm is sensed by the change in vibrating frequency of an optical fiber mounted in tension between one side of the diaphragm and a fixed mount location. Light passing through the fiber is modulated at a frequency equal to the vibrating frequency of the fiber due to changes in light attenuation brought about by bending of the fiber. The fiber is divided into two sections, one of which is used as a reference section which remains at a substantially constant tension and is caused to vibrate at an essentially constant first frequency which is different from a second frequency of the other section where tension varies with pressure applied to the diaphragm. To measure the differential pressure applied across the diaphragm, the two sections of the fiber are plucked causing them to vibrate at their natural frequency while light is transmitted through the fiber. The modulated light signal is sensed and converted to an electrical signal. This signal is bandpass filtered and the first and second frequencies mixed to generate the beat frequency of the reference and measuring vibrating sections of the continuous fiber. The beat frequency is filtered and converted to a proportional signal which is indicative of the differential pressure applied across the diaphragm. This output signal is zero and span compensated by separately detecting the reference signal which is converted to a proportional signal and subtracted from the output signal to obtain a difference signal indicative of the measured pressure which has been compensated for zero and span changes resulting from ambient temperature and humidity effects common to both sections of the fiber.

BRIEF DESCRIPTION OF THE DRAWINGS

The single figure is a partially schematic diagram of a compensated vibrating optical fiber pressure transducer according to the present invention.

DETAILED DESCRIPTION OF THE PREFERRED EMBODIMENT

Referring now to the drawing, there is shown a pressure measuring device according to the present invention in which a sensor structure 5 is provided having an upper cap portion 7 in which a diaphragm 9 is mounted to enclose a pressure chamber 11 in the cap 7. The top of cap 7 is provided with a pressure port 13 which is connected into fluid communication with a fluid medium whose pressure is to be measured by conventional means such as connecting a length of tubing (not shown) between the port and a housing containing the fluid medium whose pressure is to be measured. Pressurizing the chamber 11 produces a differential pressure across the diaphragm 9, whose opposite side is exposed to atmospheric pressure. This causes the diaphragm to deflect with the maximum deflection at the center of the diaphragm. A pair of mounting studs 15 and 17 are attached to the back side of the diaphragm 9 with one stud, 15, located at the center of the diaphragm and stud 17 located at the periphery of the diaphragm where there is essentially no deflection of the diaphragm. A continuous microbending optical fiber 19 is attached at points intermediate its ends to the studs 15 and 17 by means of an epoxy bonding cement. The ends of the fiber 19 pass through hollow tuning screws 21 and 23, respectively, which are mounted in a mounting plate 25 of the sensor structure 5. The mounting plate is held at a fixed distance from and rigidly attached to the cap portion 7 by means of three spacing legs 27 (only two of which are shown) so that the screws 21 and 23 are aligned with the studs 15 and 17, respectively. The fibers are held in the screws 21 and 23 by epoxy bonding thereby forming two separate segments 29 and 31 of the fiber which are designated as measurement and reference segments, respectively. The segments 29 and 31 are placed in selected tension by tightening nuts 33 and 35, respectively, threaded onto the screws 21 and 23 and locked into position by tightening lock nuts 37 and 39 threaded onto screws 21 and 23.

The tension of the reference segment 31 of the fiber is set so that this segment vibrates at a frequency (typically 700 Hz) different from the measurement segment 29 which is typically set at about 500 Hz. The fiber segments are simultaneously impulse excited during each measurement of the pressure applied across the diaphragm 9. Various means may be employed to excite the fiber segments, such as striking or plucking the fiber segments 29 and 31 with an electromechanical or pneumatically operated device. In the embodiment shown, an electromechanically operated striker 41 is attached to the post 27 and aligned so that a pair of hammers 43 and 45 strike the fiber segments 29 and 31, respectively, when energized by a control pulse applied thereto through input lead 47 causing the fiber segments to vibrate at their natural frequency (f) which is related approximately to the fiber tension (T) by $$f \alpha \sqrt{T}.$$

An inherent characteristic of a microbending fiber is that light transmitted through the fiber is attenuated by an amount that increases with the curvature of fiber bending. Therefore, as the fiber vibrates, it modulates the light at its frequency of vibration. Thus, during a pressure measurement light from a light source 51, such as a semiconductor laser or a light emitting diode, is introduced into one end of the fiber in a conventional manner. The modulated light signal is detected at the other end of the fiber by means of a light receiver 53, such as a photodiode, which transforms the modulated light signal into an electrical signal. This signal is fed to the input of an amplifier and bandpass filter circuit 55 which amplifies the selected bandpass of the filter and signal which is selected to correspond to the frequency range of the signals from the vibration fiber segments (typically 400 to 700 Hz). The output of the amplifier/filter 55 is fed to the input of an envelope detector 57 which generates a beat frequency of the measuring and reference vibrating sections of the fiber at the output thereof. This signal is fed through an amplifier and beat frequency bandpass filter circuit 59, which is tuned to pass the selected beat frequency band, to a frequency-to-voltage converter 61. The frequency-to-voltage converter generates a voltage signal at the output thereof whose amplitude corresponds to the beat frequency signal applied thereto and is indicative of the measured pressure.

Since the converted beat frequency signal is not perfectly linear with the applied pressure, this signal may be processed by a microprocessor circuit 63, or a programmed computer, to produce a digital or analog pressure signal (P) which is directly proportional to the diaphragm differential pressure. Further, the beat frequency signal may be compensated by subtracting an extracted reference signal from the conventional beat frequency signal prior to linearization. This may be accomplished by connecting the output of circuit 55 to a reference frequency bandpass filter circuit 65 which passes only the reference frequency signal to another frequency-to-voltage converter 67. The frequency-to-voltage converter 67 then generates a reference voltage signal which only changes when the reference frequency of vibration of the reference segment 31 of the fiber 19 changes due to a change in ambient conditions which would affect both segments of the fiber. Thus, both zero and span compensation of the pressure signal is accomplished to produce a fully compensated output pressure signal P.

A timing control circuit 69 is provided which generates the activation signal on line 47 to the actuator 41 during a pressure measurement sequence. The timing controller 69 may be activated by a signal from the programmed microprocessor 63 to start a measuring sequence. Once the strikers 43 and 45 are activated to vibrate the fiber segments 29 and 31 simultaneously, the output signal P from microprocessor 63 is read by applying a gating signal from the controller 69 to a readout device 71. This gating signal is generated following about two or three cycles of vibration of the fiber to detect the true natural frequency of vibration of the fiber segments 29 and 31. The pressure signal may be read out on a calibrated meter, stored or fed back in a control process, depending on the application of the pressure transducer. The microprocessor 63 may be programmed to sample the pressure in continuous cycles or at selected periods depending on the application.

An alternate approach to signal processing is to filter out the pressure measuring frequency component of the fiber segment 29 and the reference frequency component of fiber segment 31 separately following transformation by the light receiver circuit 53 and convert the two to analog signals for processing the difference frequency (beat frequency) and then compensating, using the reference frequency signal, for zero and span and linearizing to yield a linear pressure dependent signal.

In test of a pressure sensor 5, as shown in the drawing, a stainless steel diaphragm element was used and attached to a microbend fiber Model EOS-115 supplied by EOTec, West Haven, Conn. The light source used was a 3 milliwatt semiconductor laser operating at a wavelength of 820 nanometers. The measured frequency of the measurement segment 29 of the fiber varied from 500 Hz with a 0 psig differential down to 400 Hz with an applied differential pressure to the diaphragm of 400 psig.

Thus, it will be seen that a pressure transducer has been provided which uses a single microbending optical fiber attached in tension to a pressure sensing diaphragm and excited by an impulse into natural vibration to measure diaphragm differential pressure as a function of natural frequency of the fiber. The frequency of vibration of a reference portion of the optical fiber (reference section) is used to provide a means for both zero and span compensation, thus eliminating drift, nonrepeatedly and the need for extensive calibration.

The vibrating fiber optic pressure transducer may be used in applications where strong electromagnetic and ectrostatic interference is present and where changing ambient conditions are prevalent without affecting pressure measurements.

Although a preferred embodiment of the invention has been described using specific terms, such description is for illustrative purposes only; and it is to be understood that changes and variations may be made therein without departing from the spirit and scope of the following claims.

We claim:

1. A pressure transducer system, comprising:
    a support structure;
    a flexible diaphragm mounted in said support structure to flex in proportion to a differential pressure applied across said diaphragm;
    an optical fiber connected at points intermediate the ends thereof to said diaphragm and said support structure to form first and second tensioned segments of said optical fiber which are mounted at different degrees of tension so that they vibrate at different natural frequencies when excited, said first segment being attached to said diaphragm at a point such that flexing of said diaphragm changes the tension of said first segment thereby changing its natural resonant frequency and said second segment being attached to said diaphragm at a point such that there is substantially no change in tension during flexing of said diaphragm;
    a light source coupled to one end of said optical fiber for transmitting light through said optical fiber which is modulated at the frequencies of vibration of said first and second segments of said optical fiber to form a modulated light signal;
    a light transducing means coupled to the opposite end of said optical fiber for generating a frequency modulated electrical signal corresponding to said modulated light signal;
    means for exciting said first and second segments of said optical fibers to vibrate at their natural frequencies; and
    signal processing means responsive to the frequencies of said frequency modulated electrical signal for generating an output signal indicative of said differential pressure applied across said diaphragm.

2. The system as set forth in claim 1 wherein said optical fiber is a microbending optical fiber.

3. The system as set forth in claim 2 wherein said signal processing means includes an envelope detector means for generating a measurement signal proportional to the beat frequency signal at an output thereof corresponding to the difference in vibrating frequencies of said first and second segments of said optical fiber as an indication of the pressure differential applied across said diaphragm, means for generating a reference signal proportional to the frequency of vibration of said second segment of said optical fiber, and an output circuit means responsive to said measurement signal and said reference signal for producing a pressure signal at an output thereof which is compensated for changes in the natural vibrating frequencies of said first and second segments of said optical fiber due to changing ambient conditions which affect both said first and second segments of said optical fiber.

4. The system as set forth in claim 3 wherein said means for exciting said first and second segments of said optical fiber includes an actuator means including first and second mechanically operated strikers disposed to strike said first and second segments of said optical fiber simultaneously when activated by a control signal applied to said actuator means and further including a readout circuit means for reading out said pressure signal in response to a second control signal applied thereto and a control circuit means for generating said first and second control signals in a timed sequence such that said second control signal is generated subsequent to the generation of said first control signal.

* * * * *